Sept. 20, 1938.　　　J. CANETTA ET AL　　　2,130,612
FLUID PRESSURE BRAKE CONTROL
Filed Dec. 18, 1936　　　2 Sheets-Sheet 1
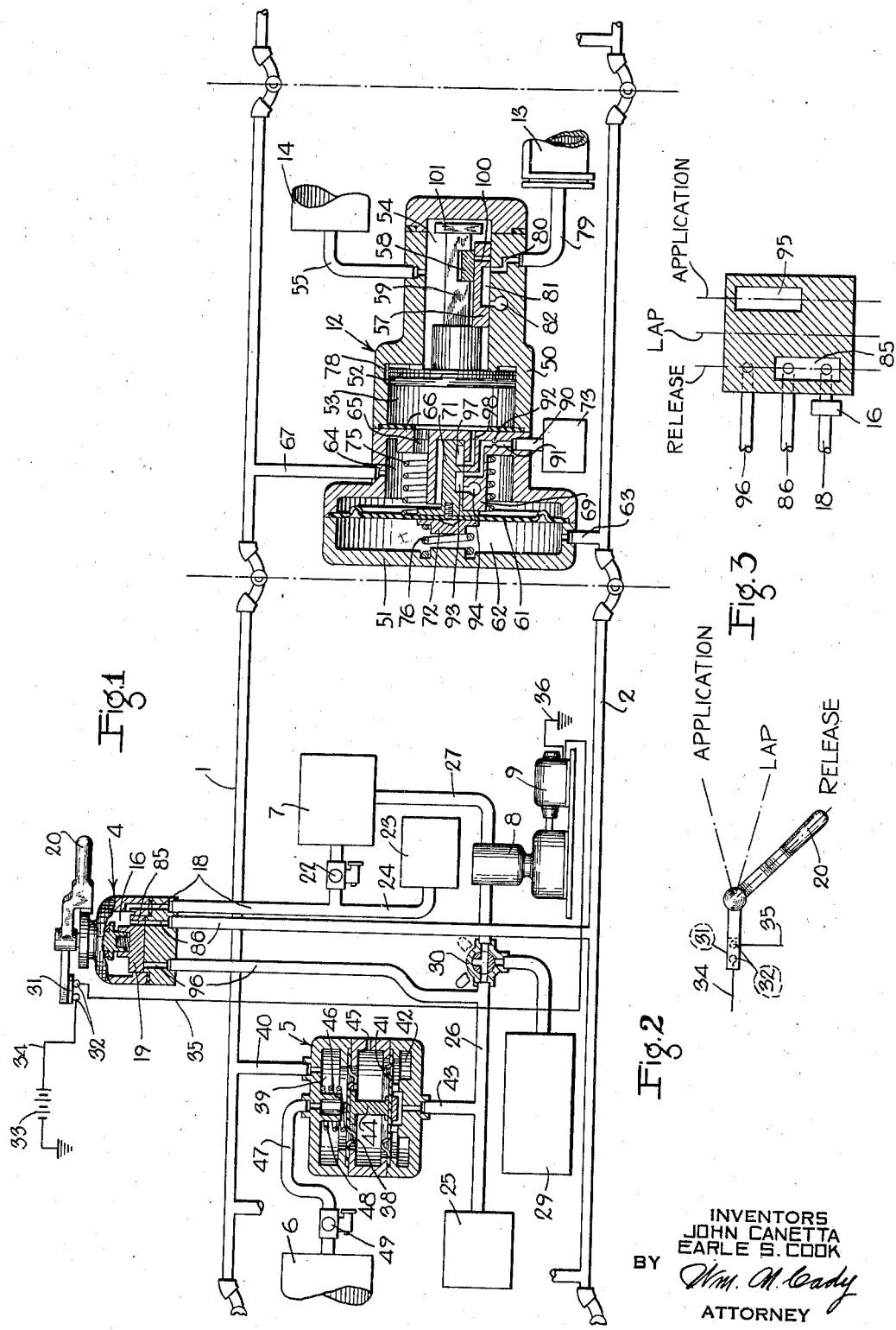
INVENTORS
JOHN CANETTA
EARLE S. COOK
BY
Wm. M. Cady
ATTORNEY Sept. 20, 1938. J. CANETTA ET AL 2,130,612
FLUID PRESSURE BRAKE CONTROL
Filed Dec. 18, 1936 2 Sheets-Sheet 2
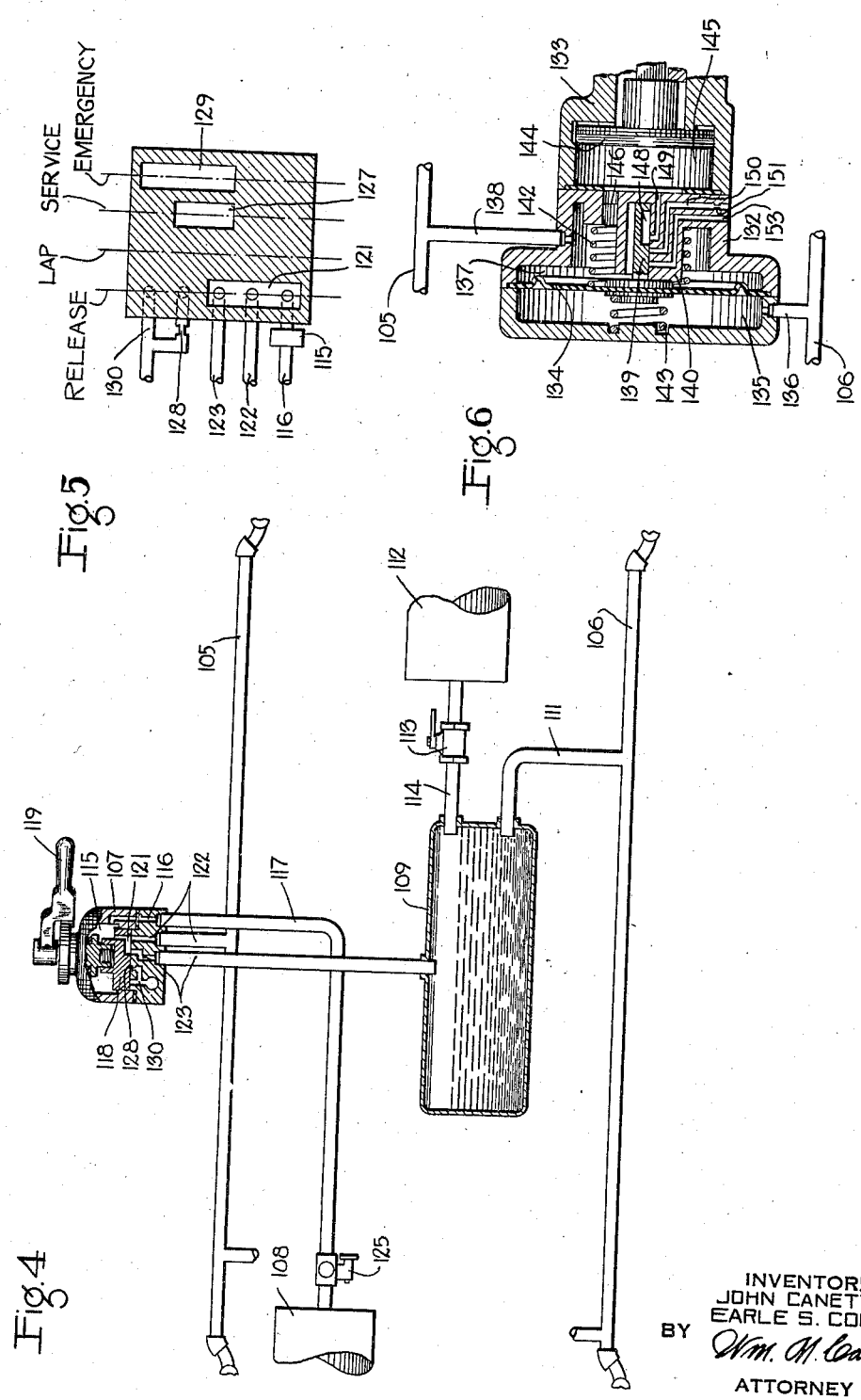
INVENTORS
JOHN CANETTA
EARLE S. COOK
BY
Wm. M. Cady
ATTORNEY Patented Sept. 20, 1938

2,130,612

UNITED STATES PATENT OFFICE 2,130,612

FLUID PRESSURE BRAKE CONTROL

John Canetta and Earle S. Cook, Wilkinsburg, Pa., assignors to The Westinghouse Air Brake Company, Wilmerding, Pa., a corporation of Pennsylvania Application December 18, 1936, Serial No. 116,446

11 Claims. (Cl. 303—13)

This invention relates to brakes for railroad vehicles, and more particularly to the type operated by fluid pressure.

In effecting an application of the brakes on a long train, it is desirable to avoid operation of the brakes on cars near the front end of the train too far in advance of operation of those on the rear cars, in order to prevent harsh slack take-up and resultant damage to equipment and lading. With air brakes of the type operative upon a reduction in the pressure of air in a brake pipe to effect an application of the brakes, it is sometimes difficult to transmit a pressure reduction wave throughout the length of the brake pipe rapidly enough to effect the desired uniform and safe operation of the brakes, due largely to the inertia characteristics of the compressed air in the brake pipe.

It is known that energy in the form of waves can be transmitted through certain mediums at rates greatly exceeding the speed of propagation of waves through air. For example, a pressure wave can be propagated through gaseous hydrogen at a rate of over four thousand feet per second, due to the inherent characteristics of that medium. Similarly, the wave speed in water is also greater than four thousand feet per second.

One object of our invention is to provide an improved fluid pressure brake system for a train adapted to utilize a medium having a fast wave propagation speed, such as hydrogen or water, for rapidly transmitting the brake actuating pressure wave throughout the train, and braking means on cars of the train adapted to respond to such a wave so as to effect the quick and substantially uniform operation of the brakes.

A further object of our invention is to provide a fluid pressure brake system adapted to utilize gaseous fluid having a high wave transmitting speed, such as hydrogen, as an operating medium, and means for preventing loss of the fluid from said system.

Another object of the invention is to provide a braking system for a train comprising air operated braking means adapted to effect the application and the release of the brakes, and apparatus associated therewith adapted to respond to waves propagated through a medium having a faster wave transmission velocity than that of air for controlling the operation of said means.

Other objects and advantages will appear in the following description of the invention, taken with reference to the accompanying drawings, wherein Fig. 1 is a diagrammatic view, mainly in section, of a fluid pressure brake apparatus embodying one form of the invention; Fig. 2 is a plan view of the brake valve handle shown in Fig. 1; Fig. 3 is a diagram showing the communications established in different positions of the brake valve shown in Fig. 1; Fig. 4 is a diagrammatic sectional view of a fluid pressure brake apparatus embodying another form of the invention; Fig. 5 is a diagram showing the communications established in various positions of the brake valve device shown in Fig. 4; and Fig. 6 is a sectional view of a brake control valve device constructed according to the invention and having service and emergency positions.

The fluid pressure brake system illustrated in Fig. 1 of the drawings is designed to employ suitable gaseous fluid such as hydrogen as the wave transmitting medium, and comprises an air brake pipe 1 adapted to be normally charged with compressed air, an operating brake pipe 2 adapted to carry hydrogen under pressure, equipment mounted on the locomotive including a brake valve device 4, a cut-off valve device 5, a main reservoir 6, a hydrogen reservoir 7, a hydrogen compressor 8 and a driving motor 9 therefore, and apparatus mounted on each car of the train comprising a brake control valve device 12, a brake cylinder 13 and an auxiliary reservoir 14.

The brake valve device 4 may be of any suitable type, and for the purpose of illustration is shown in the drawings as having a release position for controlling the supply of hydrogen to the operating brake pipe 2, a lap position, and an application position for effecting a reduction in the pressure of hydrogen in the operating brake pipe. The brake valve device 4 comprises a casing having a valve chamber 16 connected by way of a passage and pipe 18 with the hydrogen reservoir 7, and a rotary slide valve 19 mounted in the valve chamber and adapted to be manually operated by means of a handle 20. A feed valve device 22 of any suitable type is preferably interposed in the pipe 18 for supplying hydrogen from the reservoir 7 at the desired pressure, and a stabilizing reservoir 23 may be connected by way of a branch pipe 24 to the pipe 18 adjacent the outlet of the feed valve device to minimize the effect of possible fluctuations in the pressure of hydrogen delivered by said feed valve device.

A reduction reservoir 25 is provided for receiving hydrogen released from the operating brake pipe by operation of the brake valve device 4 as will hereinafter be described, said reservoir being connected by way of a pipe 26 to the intake of the compressor 8, which is operative by the motor 9 to compress the hydrogen and to supply it through a pipe 27 to the hydrogen reservoir 7.

Means is provided for replenishing the supply of hydrogen in the system in case of unavoidable loss of the gas due to leakage or other causes, comprising a hydrogen storage reservoir 29 which is adapted to carry a supply of hydrogen under high pressure. A valve 30 is interposed in the pipe 26 for normally isolating the storage reservoir 29, and is manually operative to cut off communication between the reduction reservoir 25 and the compressor 8 while connecting the storage reservoir 29 through said pipe to the compressor for permitting the desired additional supply of hydrogen under pressure to the reservoir 7.

A suitably insulated switch contact 31 is mounted on the brake valve handle 20 and is adapted in the release position thereof to bridge a pair of contacts 32 for completing a circuit for the supply of current from a source of electrical energy 33 to the motor 9, said circuit being from the source of current through conductor 34, switch contacts 31 and 32, a conductor 35, to the windings of the motor 9, and thence to ground at 36. Suitable means (not shown) for controlling operation of the compressor, such as a compressor governor, may be provided if desired.

It will be understood that the construction and arrangement of means for supplying and conserving hydrogen in the system as just described is intended to be illustrative only, and that any other means for maintaining the desired supply of hydrogen under pressure in the train pipe may be substituted if preferred, without departing from the spirit of the invention.

The cut-off valve device 5 comprises a casing having mounted therein a diaphragm 38 forming a chamber 39 which is connected by way of a pipe 40 with the air brake pipe 1, and a diaphragm 41 having a larger pressure area than the diaphragm 38 and forming a chamber 42, which communicates through a pipe 43 with the reduction reservoir pipe 26. The diaphragms 38 and 41 are connected by a stem 44, and the chamber intermediate the diaphragms is open to the atmosphere through a port 45. The diaphragm 38 is engageable with a seat rib 46 to act as a valve for controlling communication between the chamber 39 and a pipe 47 which is connected to the main reservoir 6, the diaphragm being normally urged away from the seat rib by a coil spring 48 surrounding the seat rib. The feed valve device 49 is interposed in the reservoir pipe 47 and is operative in the well known manner to supply air under the pressure which it is desired to maintain in the air brake pipe 1.

The brake controlling valve device 12 comprises a triple valve portion 50 and a pilot valve portion 51. The triple valve portion comprises a casing having a piston chamber 53 in which is mounted a piston 52, and a valve chamber 54, which is connected through a pipe 55 with the auiliary reservoir 14. A main slide valve 57 and a graduating slide valve 58 are mounted in the valve chamber 54 and are adapted to be operated by the piston 52 through the medium of a stem 59.

The pilot valve portion 51 of the device 12 comprises a casing having mounted therein a flexible diaphragm 61, which forms on one side a hydrogen chamber 62 communicating by way of a pipe 63 with the operating brake pipe 2, and has on the other side a chamber 64, which is open to the piston chamber 53 through an aperture 65 formed in a wall 66, which separates the chamber 53 from chamber 64, the chamber 64 being connected by way of a pipe 67 with the air brake pipe 1. It is desirable that the pipe 63 connecting the chamber 62 with the operating brake pipe 2 be relatively short, so as to permit free communication of pressure variation waves from the hydrogen in said brake pipe to that in said chamber.

Operatively mounted in a valve seat portion 69 projecting from the wall 66 within chamber 64 is a pilot supply valve 71, having one end centrally secured to the diaphragm 61 by means of a follower 72, which is applied to the opposite side of the diaphragm and has a bolt portion extending therethrough and adapted to have screw threaded engagement with the slide valve. The pilot slide valve 71 is arranged to control communication from the piston chamber 53 and the air brake pipe 1 connected thereto to a reduction reservoir 73, as hereinafter explained.

It will be noted that the pilot slide valve 71 is relatively small and light and is thus adapted to respond readily to operation of the sensitive diaphragm 61. A coil spring 75 is interposed between the wall 66 and the diaphragm 61 for urging the pilot slide valve 71 toward the left-hand, as viewed in the drawings, said valve being normally maintained in the release position shown in the drawings by the pressure of a coil spring 76, which is mounted between the wall of the hydrogen chamber 62 and the follower 72 and is adapted to exert greater force than the spring 75.

In preparing the fluid pressure brake system for operation, compressed air is supplied from the main reservoir 6 by the usual operation of the feed valve device 49 and flows through the pipe 47, past the normally unseated diaphragm 38 in the cut-off valve device 5, and through the chamber 39 and pipe 40 to the air brake pipe 1, which is thereby charged with air at the desired normal pressure. Air under pressure is then supplied from the air brake pipe 1 through the pipe 67 to the chamber 64 in the brake control valve device 12, and thence flows through the aperture 65 to the piston chamber 53. The pressure of air in the piston chamber 53 forces the piston 52 to the release position, as shown in the drawings, and air under pressure is then supplied from said chamber through the usual feed groove 78 to the valve chamber 54 and the connected auxiliary reservoir 14. With the triple valve parts in release position, the brake cylinder 13 is connected to the atmosphere through a pipe 79, passage 80, a cavity 81 in the main slide valve 57 and an exhaust port 82.

Any desired means may be employed to charge the operating brake pipe initially with substantially pure hydrogen, after the cars have been assembled into a train in the railway yard. For example, the operating brake pipe 2 may be initially charged with hydrogen before the locomotive is coupled to the train, by first connecting the pipe to a suitable suction pump, not illustrated, for creating a partial vacuum in the pipe, and then supplying hydrogen under pressure thereto from an outside source, after which the locomotive may be coupled to the train for maintaining the desired pressure of hydrogen in the following manner.

While the air brake system is being charged with compressed air as above described, hydrogen under substantially the same pressure as that of the air in the air brake pipe 1 is supplied from the hydrogen reservoir 7 to the pipe 18 by the automatic operation of the feed valve device 22. The hydrogen under pressure is also supplied through the pipe 24 to the stabilizing reservoir 23. With the brake valve device 4 in release position, hydrogen flows from the pipe 18 to the chamber 16 of the brake valve device and thence through port 85 in the rotary valve 19, to a passage and pipe 86 and the operating brake pipe 2.

As hereinbefore explained, with the brake valve handle 20 in release position and the circuit to the motor 9 thus completed, the compressor 8 is rendered operative to maintain the reduction reservoir 25 free of hydrogen and under a partial vacuum.

Hydrogen under pressure is then supplied from the operating brake pipe 2 through the pipe 63 to the hydrogen chamber 62 in the brake control valve device 12 on each car of the tran. The pressure of the hydrogen in the chamber 62 being substantially equal to the brake pipe pressure acting in the chamber 64, it is apparent that the diaphragm 61 and associated pilot slide valve 71 will be maintained in the release position by the spring 76 as already explained. In this position of the pilot slide valve, the reduction chamber 73 is connected to the atmosphere by way of a pipe 90, a passage 91 having a restricted portion 92, a cavity 93 in the slide valve and an exhaust port 94.

When it is desired to effect an application of the brakes, the handle 20 of the brake valve device 4 is moved to the application position wherein the connection between chamber 16 and passage 86 is lapped, while a cavity 95 in the rotary valve connects the passage 86 with a passage 96 as is indicated in Fig. 3 of the drawings. Hydrogen under pressure is then vented from the operating brake pipe 2 by way of the pipe and passage 86, cavity 95, passage 96, and pipe 26 to the reduction reservoir 25. At the same time, hydrogen under pressure thus supplied from the operating brake pipe 2 to the pipe 26 flows therefrom through the pipe 43 to the chamber 42 in the cut-off valve device 5, and moves the diaphragm 41, the follower 44 and the diaphragm 38 upwardly against the pressure of the spring 48 and of the air acting on the smaller area of said diaphragm 38, so that said diaphragm engages the seat rib 46 for preventing further supply of air under pressure to the brake pipe 1.

Due to the ability of the hydrogen to propagate the pressure reduction wave at a fast rate, the pressure reduction wave initiated as just explained is quickly transmitted through the hydrogen in the operating brake pipe 2 and causes a corresponding reduction in the pressure of the hydrogen acting in the chamber 62 in the brake control valve device 12 on each car in the train. The diaphragm 61 and the pilot slide valve 71 controlled thereby are designed to respond to slight pressure variations, and the initial reduction in the pressure of hydrogen in the chamber 62 is sufficient to permit the pressure of air in the chamber 64, as aided by the force of the spring 75, to cause the diaphragm to shift the pilot slide valve 71 to a brake pipe venting position. With the pilot slide valve 71 in venting position, the connection between the passage 91 and the atmosphere is cut off and the cavity 97 is brought into registration with a passage 98 communicating with the piston chamber 53.

Air under pressure is then vented from the air brake pipe 1 by way of the pipe 67, chamber 64, aperture 65, piston chamber 53, passage 98, cavity 97 and passage 91 to the reduction reservoir 73.

As the pressure of air in the chamber 53 is thus reduced, the pressure of the air in the valve chamber 54 in the triple valve portion 50 causes operation of the piston 52 to close the feed groove 78, and to move the auxiliary slide valve 58 relative to the main slide valve 57 for uncovering a service port 100 in said main slide valve. Continued movement of the piston 52 brings a lug 101 formed on the stem 59 into engagement with the main slide valve 57, which is then shifted into application position. With the triple valve parts in application position, air under pressure is supplied from the auxiliary reservoir by way of the pipe 55, valve chamber 54, the service port 100 in the main slide valve, port 80 and pipe 79 to the brake cylinder 13, thereby effecting an application of the brakes.

Meanwhile, when the pressure of hydrogen in the operating brake pipe 2 has been reduced sufficiently, by operation of the brake valve device 4 as already described, to effect the desired degree of application of the brakes, said brake valve device is moved into lap position, wherein further venting of hydrogen from the operating brake pipe is cut off. When the pressure of air in the piston chamber 53 of the brake control valve device 12 and in the connected valve chamber 64 has been reduced by flow to the reduction reservoir 73 to a value slightly less than that of the hydrogen pressure acting in the chamber 62, the flexible diaphragm 61 is forced to the release position as shown in the drawings by the pressure of the spring 76 and of the hydrogen in the chamber 62. In so moving diaphragm 61 shifts the pilot slide valve 71 to its release position, in which further venting of air from the brake is prevented.

Further reduction in the pressure of air in the chamber 53 is thus prevented, and when continued supply of air under pressure from the auxiliary reservoir 14 and chamber 54 to the brake cylinder reduces the air pressure in said chamber slightly below that in chamber 53, the piston 52 will be operated so as to shift the auxiliary slide valve 58 into lap position wherein the service port 100 in the main slide valve 57 is lapped, thus cutting off further supply of air from the auxiliary reservoir 14 to the brake cylinder 13.

When it is desired to effect the release of the brakes, the handle 20 of the brake valve device 24 is moved to release position, thereby causing the rotary valve 19 to establish communication, as already described, permitting the supply of hydrogen under pressure from the main hydrogen reservoir 7 to the operating brake pipe 2. At the same time, the contact 31 carried on the handle 20 is brought into engagement with the contacts 32, thereby completing the circuit through which current is supplied to the driving motor 9, which then operates the hydrogen compressor 8 for withdrawing hydrogen under pressure from the reduction reservoir 25 by way of the pipe 26 and supplying said hydrogen under pressure through the pipe 27 to the hydrogen reservoir 7.

As the pressure in the reduction reservoir 25 and in the chamber 42 in the cut-off valve device 5 connected thereto is thus rapidly reduced, the spring 48 is permitted to move the diaphragm 38, the follower 44 and the diaphragm 41 downwardly, thereby moving said diaphragm away from the seat rib 46. With the diaphragm 38 unseated, air under pressure is again supplied from the main reservoir 6 by the usual operation of the feed valve device 49 to the pipe 47 and flows thence through the chamber 39 and the pipe 40 to the brake pipe 1. Air under pressure thus supplied to the air brake pipe 1 flows therefrom through the pipe 67 to the connected chambers 64 and 53 in the brake controlling valve device 12 and operates the piston 52 to shift the main slide valve 57 to the release position, wherein the brake cylinder 13 is again connected to the atmosphere through the pipe 79, passage 80, cavity 81 in said slide valve and the exhaust port 82.

Referring to Fig. 4 of the drawings, there is illustrated another form of our invention embodying fluid pressure brake apparatus adapted to employ a liquid, such as water, as the medium through which the brake controlling impulse or pressure reduction wave may be transmitted throughout the train.

The apparatus shown in Fig. 4 of the drawings is adapted to be mounted on the locomotive and includes an air brake pipe 105, an operating brake pipe 106, a brake valve device 107, a main reservoir 108 and a liquid reservoir 109. The operating brake pipe 106 is adapted to be supplied with liquid and is connected through a pipe 111 with the lowermost portion of the liquid reservoir 109, which is adapted to contain a body of liquid that may be supplied as needed from a liquid supply tank 112 by operation of a control valve 113 interposed in a pipe 114 connecting said tank with the reservoir.

The brake valve device 107 is adapted to control the supply of air under pressure to the brake pipe 105, and also to control the air pressure exerted on the liquid in the reservoir 109. The brake valve device 107 comprises a casing having a valve chamber 115 connected through a passage 116 and a pipe 117 to the main reservoir 108, and having mounted therein a rotary valve 118 which is adapted to be operated through the medium of the usual handle 119. The rotary valve 118 is provided with a cavity 121, which is open to the valve chamber 115. With the rotary valve in release position as shown in Fig. 4, the cavity 121 is connected by way of a passage and pipe 122 with the air brake pipe 105, and also by way of a passage and pipe 123 with the liquid reservoir 109.

While the apparatus adapted to be mounted upon the cars in the train is not included in Fig. 4 of the drawings, it will be understood that the equipment there shown is adapted to be associated with suitable apparatus including a brake control valve device, a brake cylinder and an auxiliary reservoir, the brake control valve device being preferably that shown in Fig. 6.

Referring to Fig. 6 of the drawings, there is illustrated a form of brake control valve device designed for association with the apparatus shown in Fig. 4, and which may be operated on substantially the same principle as the brake control valve device 12 shown in Fig. 1 but which includes means responsive to pressure reduction waves of different intensities propagated through the wave transmitting medium, for effecting either service or emergency applications of the brakes.

The brakes control valve device shown in Fig. 6 comprises a pilot valve portion 132 and a triple valve portion 133. Mounted in the pilot valve portion 132 is a flexible diaphragm 134, which forms on one side a chamber 135 communicating through a pipe 136 with the operating brake pipe 106 adapted to contain the pressure wave transmitting medium, and which diaphragm forms on the other side a valve chamber 137 that is connected by way of a pipe 138 with the air brake pipe 105. For controlling communication through which air under pressure may be vented from the brake pipe there is provided a pilot slide valve 139, which has one end centrally secured to the diaphragm 134, and is slidably mounted in a valve seat portion 140. A coil spring 142 is disposed in the chamber 137 for urging the diaphragm 134 and the pilot slide valve 139 toward the left-hand, and a coil spring 143 is interposed between the wall of the chamber 135 and the diaphragm 134 and acts on said diaphragm in opposition to the spring 142. The spring 143 is adapted to exert a greater force than the spring 142, so that the diaphragm 134 and the pilot slide valve 139 are normally maintained in the release position, as shown in Fig. 6 of the drawings.

It is not deemed necessary to illustrate the triple valve portion 133 in detail, it being understood that any of the well known triple valve constructions may be provided, having means adapted to respond to variations in brake pipe pressure for effecting either service or emergency applications of the brakes, which means may include a triple valve piston 144 which is subject to the pressure of air in a chamber 145 connected through a passage 146 and the chamber 137 with the air brake pipe 105.

In operation, air at the pressure normally carried in the fluid pressure brake system is supplied from the main reservoir 108 shown in Fig. 4 of the drawings to the pipe 117 by the usual operation of the feed valve device 125, which is similar to the feed valve device 49 shown in Fig. 1. From the pipe 117, air under pressure is supplied through the passage 116 in the brake valve device 107 to the valve chamber 115, and thence flows through the cavity 121 in the rotary valve 118 and through the passage and pipe 122 to the air brake pipe 105. Air under pressure from the cavity 121 is also supplied through the passage and pipe 123 to the water reservoir 109, thereby subjecting the liquid therein and in the operating brake pipe 106 to substantially the same pressure as that normally maintained in the air brake pipe 105.

It will be understood that upon the increase in the pressure of air in the air brake pipe 105 and of the liquid in the operating brake pipe 106, the brake control valve device illustrated in Fig. 6 will be operated to its release position, the connected chambers 137 and 145 in the brake control valve device being supplied with air under pressure from the air brake pipe 105 by way of the pipe 138, while liquid is supplied from the operating brake pipe 106 through the pipe 136 to the chamber 135.

Suitable means may, of course, be provided for preventing entrapment of air above the liquid within the chamber 135. Each control valve device may have an automatic release valve, not shown, such as the well known type comprising a floating check valve which may control an atmospheric communication from the chamber 135 and may be adapted to be floated into seated position for preventing escape of liquid through the communication. A float valve of the above type is illustrated in the U. S. Patent No. 1,660,466 to B. S. Aikman. It will also be understood that, when the train pipe and control valve on a car have once been charged with liquid, the liquid may be retained therein even when the car is not connected in a train, by proper operation of the usual train pipe cutout cocks, not shown.

In order to effect a service application of the brakes, the handle 119 of the brake valve device 107 is moved to service position, wherein a cavity 127 in the rotary valve 118 registers with the passage 123 and with a restricted atmospheric exhaust passage 128, thereby effecting reduction in the pressure of air contained above the liquid in the reservoir 109 at a slow or service rate. It will be noted that with the brake valve device 107 in service position, the communication between the valve chamber 115 and the passage 122 is cut off, so that further supply of air under pressure from the main reservoir 108 to the air brake pipe 105 is prevented.

As a result of the service rate of reduction in the pressure of air acting on the liquid in the reservoir 109 as just described, a pressure reduction wave is initiated in the liquid in the operating brake pipe 106, and is rapidly transmitted therethrough for actuating the brake control valve devices such as that illustrated in Fig. 6 to effect a service application of the brakes.

The pressure wave thus initiated in the operating brake pipe causes a reduction in the pressure of liquid in the chamber 135 of the device shown in Fig. 6 at a service rate, so that the pressure of air in the chamber 137 and of the spring 142 is permitted to move the diaphragm 134 and the pilot slide valve 139 toward the left-hand, until a cavity 148 formed in the slide valve establishes communication between a passage 149 and an atmospheric exhaust passage 150 having a restricted portion 151. Air under pressure is then vented from the brake pipe 105 to atmosphere by way of the pipe 138, the chamber 137, the chamber 145 connected thereto, the passage 149, the cavity 148, and the exhaust passage 150 and restricted portion 151, the consequent reduction in the pressure of air acting in the chamber 137 against the diaphragm 134 being such as to prevent further movement of said diaphragm and of the pilot slide valve 139 toward the left hand. Upon the reduction in the pressure of air in the chamber 145, the piston 144 is operated in the usual manner to move the triple valve parts (not shown) to service position for effecting a service application of the brakes.

If it is desired to effect an emergency application of the brakes, the brake valve device 107 shown in Fig. 4 of the drawings is moved to the emergency position, in which a cavity 129 in the rotary valve 118 connects the passage 123 with an atmospheric exhaust port 130, while communication from the main reservoir 108 to the air brake pipe 105 is cut off, as is best shown in Fig. 5 of the drawings. Air under pressure is then vented from the reservoir 109 through the pipe and passage 123, the cavity 129 in the rotary valve 118, and the atmospheric exhaust passage 130 at an emergency rate, thereby causing a sudden reduction in the pressure of the liquid in said reservoir in the operating brake pipe 106, so that a pressure reduction wave of emergency intensity is rapidly transmitted through said pipe for effecting operation of the brake control valve devices to their emergency positions. As the pressure of the transmitting fluid in the operating brake pipe 106 and in the chamber 135 of the brake control valve device connected thereto as shown in Fig. 6 is reduced at an emergency rate, the pressure of air in the chamber 137, aided by the force of the spring 142, acts to move the diaphragm 134 and the pilot slide valve 139 to the emergency position, overcoming the force of the spring 143. With the pilot slide valve 139 in emergency position, the cavity 148 therein connects the passage 149 with a large exhaust passage 153, so that air under pressure is quickly vented to atmosphere from the chamber 145 and from the air brake pipe 105 connected thereto by flow of air through the passage 149, the cavity 148 and said exhaust passage at a fast rate, whereupon said triple valve piston 144 and the associated parts of the triple valve portion 133 are operated in the usual manner to effect an emergency application of the brakes.

It will thus be evident that our invention provides a fluid pressure system adapted to be employed on a long train, and including air brake means and actuating means located on cars of the train responsive to variations in the pressure of a fluid medium having the property of transmitting energizing waves at a fast rate for controlling the operation of the air brake means, together with means for controlling the supply and release of said fluid medium in the system.

While several illustrative embodiments of our invention have been described in detail, it is not our intention to limit its scope to these embodiments or otherwise than by the terms of the appended claims.

Having now described our invention, what we claim as new and desire to secure by Letters Patent, is:

1. In a fluid pressure brake system, in combination, a brake pipe normally charged with air under pressure, brake controlling valve means operative upon a reduction in the pressure of air in said brake pipe for effecting an application of the brakes, a train pipe normally charged with a fluid medium having the property of propagating waves of pressure variation at a speed higher than that in air, pilot valve means operative upon a reduction in the pressure of said fluid medium in the train pipe for venting air under pressure from the brake pipe, manually controlled means operative to effect a reduction in the pressure of the fluid medium in said train pipe, and means controlling the supply of air to the brake pipe and operative in response to operation of said manually controlled means for cutting off said supply.

2. In a fluid pressure brake system, in combination, a brake pipe normally charged with air under pressure, brake controlling valve means operative upon a reduction in the pressure of air in said brake pipe for effecting an application of the brakes and upon an increase in the pressure of air in said brake pipe for effecting the release of the brakes, a train pipe adapted to be supplied with a fluid medium having the property of propagating waves of pressure variation at a speed higher than that in air, pilot valve means operative in response to a reduction in the pressure of the fluid medium in said train pipe for venting air under pressure from said brake pipe, a brake valve device operable to discharge a quantity of said fluid medium from the train pipe to a chamber for initiating a wave of pressure reduction in said fluid medium, and means controlling the supply of air under pressure to the brake pipe and operative upon an increase in fluid pressure in said chamber for cutting off said supply.

3. In a fluid pressure brake, in combination, a brake pipe normally charged with air under pressure, braking means including a brake control valve device operative upon a service rate of reduction in brake pipe pressure to effect a service application of the brakes and upon an emergency rate of reduction in brake pipe pressure to effect an emergency application of the brakes, a train pipe normally charged with a fluid medium having the property of propagating waves of pressure variation at a velocity greater than that in air, and pilot valve means subject to the pressure of said fluid medium in the train pipe, said pilot valve means being operative upon a wave of variation in the pressure of said fluid medium of low intensity to vent air from said brake pipe at a service rate, and upon a wave of pressure variation in said fluid medium of greater intensity to vent air under pressure from said brake pipe at an emergency rate.

4. In a fluid pressure brake system, in combination, an air brake pipe, means for supplying air under pressure to said air brake pipe, brake controlling valve means operative upon a reduction in the pressure of air in said air brake pipe for effecting an application of the brakes, an operating brake pipe normally charged with a fluid medium having the property of propagating waves of pressure variation at a speed higher than that in air, pilot valve means operative upon a reduction in the pressure of said fluid medium in the operating brake pipe for venting air under pressure from said air brake pipe, means operative to effect a reduction in the pressure of the fluid medium in said operating brake pipe, and means automatically operative to cut off the supply of air to said air brake pipe when the pressure of said fluid medium in said operating brake pipe is reduced.

5. In a fluid pressure brake system, in combination, an air brake pipe, means for supplying air under pressure to said air brake pipe, brake controlling valve means operative upon a reduction in the pressure of air in said air brake pipe for effecting an application of the brakes, an operating brake pipe adapted to be supplied with a fluid medium having the property of propagating waves of pressure variation at a speed higher than that in air, means for subjecting said fluid medium in the operating brake pipe to the pressure of air in said air brake pipe, pilot valve means responsive to a pressure reduction wave transmitted through the fluid medium in said operating brake pipe for venting air under pressure from said air brake pipe, and control apparatus operative to initiate the pressure reduction wave in said fluid medium in the operating brake pipe and to cut off the supply of air under pressure to said air brake pipe.

6. In a fluid pressure brake system, in combination, a brake pipe normally charged with air under pressure, brake controlling valve means operative upon a reduction in the pressure of air in said air brake pipe for effecting an application of the brakes, an operating brake pipe normally charged with a fluid medium having the property of propagating waves of pressure variation at a speed higher than that in air, pilot valve means operative upon a reduction in the pressure of said fluid medium in the operating brake pipe for venting air under pressure from said air brake pipe, brake valve means operable to discharge a quantity of said fluid medium from the operating brake pipe to a reduction reservoir for initiating a wave of pressure reduction in said fluid medium, and means including a compressor operative to supply fluid medium from said reduction reservoir to the operating brake pipe.

7. In a fluid pressure brake system, in combination, a brake pipe normally charged with air under pressure, brake controlling valve means operative upon a reduction in the pressure of air in said brake pipe for effecting an application of the brakes, an operating brake pipe normally charged with a fluid medium having the property of propagating waves of pressure variation at a speed higher than that in air, pilot valve means operative upon a reduction in the pressure of said fluid medium in the operating brake pipe for venting air under pressure from said air brake pipe, means operable to discharge a quantity of said fluid medium from the operating brake pipe to a chamber for initiating a wave of pressure reduction in said fluid medium, and fluid medium supply apparatus including a reservoir adapted for communication with the operating brake pipe and a compressor having inlet communication with said reduction chamber and outlet communication with said reservoir.

8. In a fluid pressure brake system, in combination, a brake pipe normally charged with air under pressure, brake controlling valve means operative upon a reduction in the pressure of air in said air brake pipe for effecting an application of the brakes, an operating brake pipe normally charged with a fluid medium having the property of propagating waves of pressure variation at a speed higher than that in air, pilot valve means operative upon a reduction in the pressure of said fluid medium in the operating brake pipe for venting air under pressure from said air brake pipe, brake valve means operable to discharge a quantity of said fluid medium from the operating brake pipe to a reduction reservoir for initiating a wave of pressure reduction in said fluid medium, a supply reservoir from which the fluid medium is supplied to the operating brake pipe and a compressor operative to supply fluid medium from said reduction reservoir to said supply reservoir.

9. In a fluid pressure brake system, in combination, a brake pipe, means operative upon a reduction in brake pipe pressure for effecting an application of the brakes, a reduction reservoir, a brake valve device operative to vent fluid from said brake pipe to said reduction reservoir, a supply reservoir from which fluid is supplied to said brake pipe, and a compressor for supplying fluid from said reduction reservoir to said supply reservoir.

10. In a fluid pressure brake, in combination, a brake pipe normally charged with air under pressure, braking means including a brake control valve device operative in response to different degrees of reduction in brake pipe pressure to effect application of the brakes corresponding in degree to the rate at which brake pipe pressure is reduced, a train pipe normally charged with a fluid medium having the property of propagating waves of pressure variation at a velocity greater than that of air, and pilot valve means subject to the pressure of said fluid medium in the train pipe, said pilot valve means being operative in response to a wave of variation in the pressure of said fluid medium to vent air from said brake pipe at a rate corresponding to the intensity of the wave of pressure variation in said fluid medium.

11. In a fluid pressure brake system, in combination, a brake pipe normally charged with air under pressure, brake controlling valve means operative upon a reduction in the pressure of air in said brake pipe for effecting an application of the brakes and upon an increase in the pressure of air in said brake pipe for effecting the release of the brakes, a train pipe adapted to be supplied with a fluid having the property of propagating waves of pressure variation at a speed higher than that in air, pilot valve means operative in response to a reduction in the pressure of fluid medium in said train pipe for venting air under pressure from said brake pipe, and control apparatus operative to effect sudden withdrawal of a quantity of said fluid medium from the train pipe and to cut off the supply of air to said brake pipe.

JOHN CANETTA.
EARLE S. COOK.